(12) United States Patent
Cha et al.

(10) Patent No.: US 12,739,078 B2
(45) Date of Patent: Sep. 15, 2026

(54) SENSING REFERENCE SIGNAL CONFIGURATION

(71) Applicant: Nokia Technologies Oy, Espoo (FI)

(72) Inventors: Hyun-Su Cha, Naperville, IL (US); Abdurrahman Fouda, Naperville, IL (US); Ryan Keating, Naperville, IL (US); Serdar Ozen, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 272 days.

(21) Appl. No.: 18/416,159

(22) Filed: Jan. 18, 2024

(65) Prior Publication Data

US 2024/0259157 A1 Aug. 1, 2024

Related U.S. Application Data

(60) Provisional application No. 63/481,921, filed on Jan. 27, 2023.

(51) Int. Cl.
*H04L 5/00* (2006.01)
*H04W 24/10* (2009.01)
*H04W 64/00* (2009.01)

(52) U.S. Cl.
CPC .......... *H04L 5/0051* (2013.01); *H04W 24/10* (2013.01); *H04W 64/00* (2013.01)

(58) Field of Classification Search
CPC .......... H04L 5/00; H04W 24/10; H04W 64/00
See application file for complete search history.

(56) References Cited

U.S. PATENT DOCUMENTS

| | | | | |
|---|---|---|---|---|
| 2019/0075543 | A1 | 3/2019 | Kim et al. | |
| 2019/0363810 | A1* | 11/2019 | Luo | H04B 17/345 |
| 2021/0337411 | A1 | 10/2021 | Xu et al. | |
| 2022/0095319 | A1 | 3/2022 | Duan et al. | |
| 2022/0244344 | A1* | 8/2022 | Bao | H04W 8/24 |
| 2022/0252709 | A1 | 8/2022 | Duan et al. | |
| 2022/0329462 | A1 | 10/2022 | Kang et al. | |
| 2023/0354254 | A1* | 11/2023 | Sundararajan | G01S 5/0244 |

FOREIGN PATENT DOCUMENTS

| | | | | |
|---|---|---|---|---|
| EP | 3024266 | B1 | 5/2018 | |
| EP | 3413656 | * | 12/2018 | H04W 72/04 |
| EP | 3413656 | A1 | 12/2018 | |

OTHER PUBLICATIONS

Barneto et al., "Full-Duplex OFDM Radar With LTE and 5G NR Waveforms: Challenges, Solutions, and Measurements", IEEE Transactions on Microwave Theory and Techniques, vol. 67, No. 10, Oct. 2019, pp. 4042-4054.

(Continued)

*Primary Examiner* — Myron Wyche
(74) *Attorney, Agent, or Firm* — Robert P. Michal, Esq.; Rimon PC

(57) ABSTRACT

Various techniques are provided for a method of operating a network device including communicating, by a network entity to a user equipment (UE), an uplink sensing reference signal configuration, communicating, by the network entity to the UE, a criterion for reporting sensing reference signal measurements, and receiving, by the network entity from the UE, a sensing signal measurement report based on the criterion for reporting sensing reference signal measurements.

1 Claim, 10 Drawing Sheets

Communicating, by a network entity to a user equipment (UE), an uplink sensing reference signal configuration — S705

Communicating, by the network entity to the UE, a criterion for reporting sensing reference signal measurements — S710

Receiving, by the network entity from the UE, a sensing signal measurement report based on the criterion for reporting sensing reference signal measurements — S715

(56) References Cited

OTHER PUBLICATIONS

Hossain et al., "THz Channel Model for 6G Communications", IEEE 32nd Annual International Symposium on Personal, Indoor and Mobile Radio Communications (PIMRC), Sep. 13-16, 2021, 7 pages.
Chaccour et al., "Joint Sensing and Communication for Situational Awareness in Wireless THz Systems", IEEE International Conference on Communications (ICC), May 16-20, 2022, pp. 3772-3777.
"Msc-generator", Sourceforge, Retrieved on May 12, 2024, Webpage available at :https://sourceforge.net/projects/msc-generator/.
"Results on evaluation of achievable positioning accuracy and latency", 3GPP TSG RAN WG1 #103-e, R1-2009555, Agenda: 8.5.2, Nokia, Nov. 5, 2020, 10 pages.
"3rd Generation Partnership Project; Technical Specification Group Radio Access Network; NR; Physical layer procedures for data (Release 17)", 3GPP TS 38.214, V17.3.0, Sep. 2022, pp. 1-232.
"3rd Generation Partnership Project; Technical Specification Group Radio Access Network; LTE Positioning Protocol (LPP) (Release 17)", 3GPP TS 37.355, V17.2.0, Sep. 2022, pp. 1-347.
"3rd Generation Partnership Project; Technical Specification Group Radio Access Network; NG-RAN; NR Positioning Protocol A (NRPPa) (Release 17)", 3GPP TS 38.455, V17.2.0, Sep. 2022, pp. 1-201.
"Carrier phase measurement method for sidelink positioning", 3GPP TSG RAN WG1 Meeting #109-e, R1-2204092, Agenda: 9.5.1.3, Locaila, May 9-20, 2022, 3 pages.
"Use cases and applications on Carrier Phase Based Positioning for NR", 3GPP TSG RAN WG1 Meeting #108-e, R1-2201399, Agenda: 8.5.6, Locaila, Feb. 21-Mar. 3, 2022, 13 pages.
Wei et al., "5G PRS-Based Sensing: A Sensing Reference Signal Approach for Joint Sensing and Communication System", arXiv, Nov. 21, 2022, pp. 1-23.
Extended European Search Report received for corresponding European Patent Application No. 23217448.2, dated May 6, 2024, 15 pages.

* cited by examiner

SENSING REFERENCE SIGNAL CONFIGURATION

TECHNICAL FIELD

This description relates to wireless communications. Particularly, the present description relates to sensing reference signal configuration.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency. The continued mobile broadband evolution can also include 5G-Advanced, 6G, and beyond.

The estimation of the location of the UE is used to provide location-based service of the wireless communication system. 5G NR introduced positioning functionality to the wireless network and enhanced the positioning accuracy and latency performance with additional techniques.

SUMMARY

According to an example embodiment, a method may include a method of operating a network device including communicating, by a network entity to a user equipment (UE), an uplink sensing reference signal configuration, communicating, by the network entity to the UE, a criterion for reporting sensing reference signal measurements, and receiving, by the network entity from the UE, a sensing signal measurement report based on the criterion for reporting sensing reference signal measurements.

According to another example embodiment, a method of operating a user equipment including receiving, by a user equipment (UE) from a network entity, an uplink sensing reference signal configuration, receiving, by the UE from the network entity, a criterion for reporting sensing reference signal measurements, measuring, by the UE, sensing reference signals, and communicating, by the UE to the network entity, a sensing reference signal measurement report based on the measured sensing signals and the criterion for reporting sensing signal measurements.

According to yet another example embodiment, a method may include a method of operating a network device including communicating, by a network entity to a user equipment (UE), a criterion to select detectable Transmission Reception Point (TRP) configuration, receiving, by the network entity from the UE, a list of TRPs, communicating, by the network entity to the UE, an uplink sensing reference signal configuration based on the list of TRPs, and receiving, by the network entity from the UE, a sensing reference signal measurement report based on the criterion for reporting sensing reference signal measurements.

According to still another example embodiment, a method of operating a user equipment including receiving, by a user equipment (UE) from a network entity, a criterion to select detectable Transmission Reception Point (TRP), measuring, by the UE, downlink positioning reference signals from at least one TRP, determining, by the UE, a list of detectable TRPs based on the measured downlink positioning reference signals and the criterion to select detectable TRP, and communicating, by the UE to the network entity, the list of detectable TRPs.

According to some examples, there is provided the subject matter of the independent claims.

The details of one or more examples of embodiments are set forth in the accompanying drawings and the description below. Other features will be apparent from the description and drawings, and from the claims.

DETAILED DESCRIPTION

Figure 1:
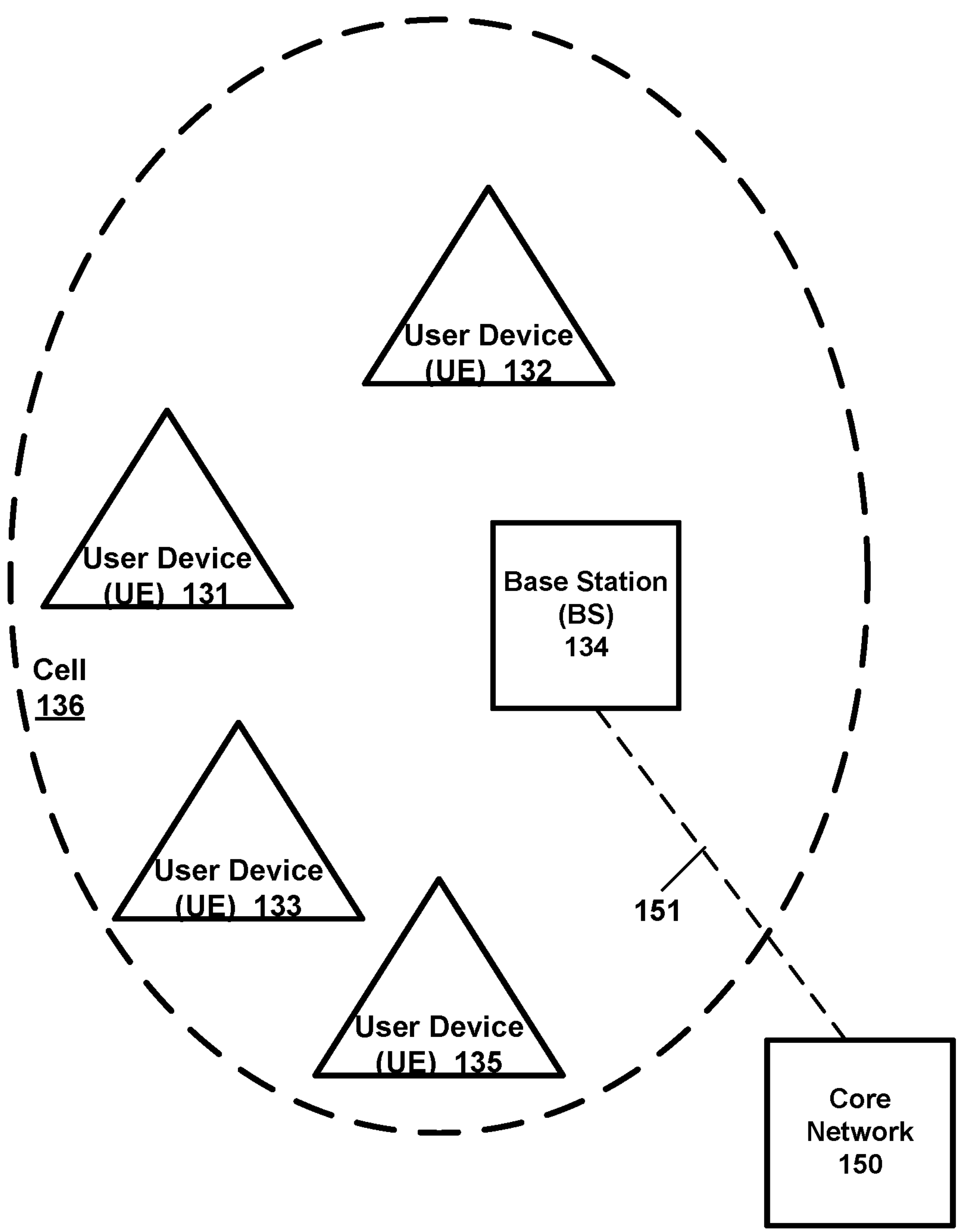
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a SI interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node and sending data to and/or receiving data from one or more of the UEs. For example, after establishing a connection to a UE, a RAN node (e.g., BS, NB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a, a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a, a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)), 5G-Advanced, 6G, and the like may also include a core network (e.g., which may be referred to as 5GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) and 6G development may support a number of different applications or a number of different data service types, such as for example: machine type communications (MTC), enhanced machine type communication (eMTC), massive MTC (mMTC), Internet of Things (IoT), and/or narrowband IoT user devices, enhanced mobile broadband (cMBB), and ultra-reliable and low-latency communications (URLLC). Many of these new 5G (NR) and 6G-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (cMBB) may support much higher data rates than currently available in LTE.

Ultra-reliable and low-latency communications (URLLC) is a new data service type, or new usage scenario, which may be supported for New Radio (5G) and 6G systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an cMBB UE (or an eMBB application running on a UE).

The various example embodiments may be applied to a wide variety of wireless technologies or wireless networks, such as LTE, LTE-A, 5G (New Radio (NR)), 6G, cmWave, and/or mm Wave band networks, IoT, MTC, eMTC, mMTC, eMBB, URLLC, etc., or any other wireless network or wireless technology. These example networks, technologies or data service types are provided only as illustrative examples.

Further enhancement on NR positioning is ongoing and enhanced positioning technique such as Carrier Phase (CP), Carrier Aggregation (CA) and sidelink (SL) positioning may be introduced in NR. In future wireless communication systems and generations (e.g., 6G), a functionality to sense a specific object may be supported from not only gNBs/TRPs but also from the user equipment devices, and this may be a feature that may be configured to enhance the positioning. In addition, recent studies can indicate that THz and sub-THz, (e.g., 90 GHz to 300 GHz, 90 GHz to 500 GHz, frequencies above 100 GHz, and/or the like) may be promising frequency ranges for the cellular communications as wide frequency bandwidth is applicable. The localization and sensing based on sub-THz frequency ranges could be a solution for improved accuracy with low wireless resource overhead, as the transmitter and the receiver can be the same for the sensing signals.

Object detection and classification can include the use of both radar (e.g., detection and possibly identification) and sensing (e.g., detection) and gNBs may be configured to "see" the cell. This can include identifying where in the cell users are located. As an example, a gNB may be configured to determine a speed of a UE (or other objects) using radar and/or sensing. A negative relative speed can indicate that the UE is moving "away" from the gNB, while a positive speed can indicate that the UE is moving towards the gNB. In addition, two (or more) objects at the same distance having relatively different intensities can indicate that the object with higher intensity level may have a larger radar cross section than the object with lower intensity.

Even considering the above, a problem in existing and future wireless communication systems can be that support for sensing techniques to estimate the location of the UE do not exist. For example, in sub-THz frequency bands such as 100 GHz or 150 GHz, the detectable range for sensing has not been identified in existing and future wireless communication systems. In addition, incorporating sensing into the existing positioning/location technologies available in 5G is an unresolved problem. In addition, a sensing range may be within (or less than) the communication range due to the increased path loss for sensing signals which needs to bounce back from an object to the transmitter in order to be processed. Therefore, how to do joint sensing and localization in a network which has a limited sensing range becomes a relevant problem.

Example implementations describe use of sensing technique and classical positioning technique to estimate the location of the UE in the sub-THz carrier frequency (and other frequency ranges). Example implementations consider the detectable range of sensing for the sub-THz and include a criterion to use sensing technique. At least three (3) techniques for solving these problems are described below. These example implementations describe a network configuration and operation including sensing reference signals to estimate UE location. The UEs can be configured with uplink and/or downlink positioning reference signals (PRS) from a network entity such as Location management Function (LMF), location server, and/or sensing server sometimes referred to as a network entity. The network entity can be located in any network device (e.g., BS, DU, CU, and/or the like). In some implementations, the network entity can configure the sensing reference signals to the UE, and the network entity may initiate sensing functionality by indicating or triggering the UE to transmit sensing reference signals. The sensing server can be a network entity configured to perform the sensing and/or positioning functionality. The UEs can be configured with uplink sensing reference signals from a network entity such as sensing server or LMF. In some cases, for example, if network connection is lost, operations performed by the network entity (e.g., LMF, sensing server, and/or location server) may be configured to be performed by a UE. In that case, for example, the UE may be sometimes referred to as a server UE or UE acting as LMF and/or sensing server UE.

Figure 2:
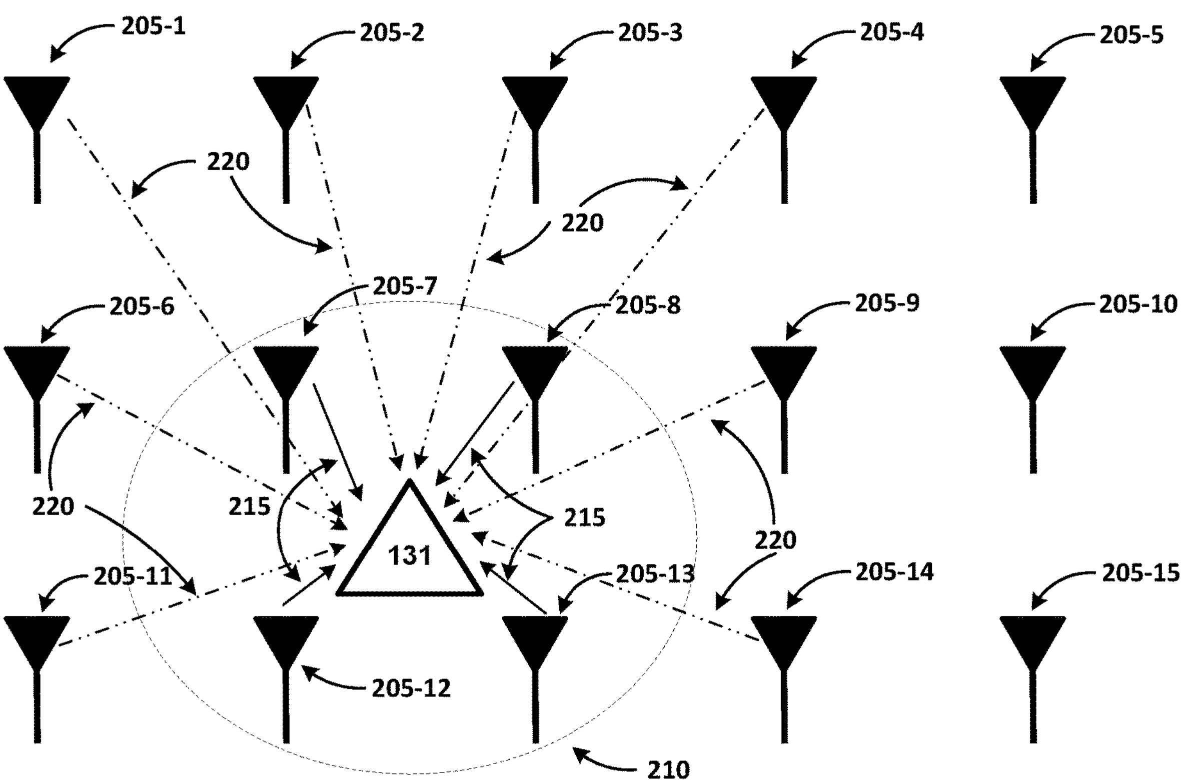
FIG. 2 is a diagram illustrating a joint sensing and positioning wireless communication network according to an example embodiment.

FIG. 2 is a diagram illustrating a joint sensing and positioning wireless communication network according to an example embodiment. As shown in FIG. 2, the wireless communication network includes a plurality of transmission reception points (TRPs) 205-1 to 205-15 servicing the UE 131. The UE 131 is illustrated as being in a sensing region 210 shown as including (but not limited to) four (4) TRPs 205-7, 205-8, 205-12, 205-13. FIG. 2 can illustrate a joint sensing and positioning based on downlink sensing and PRS transmission from TRP.

In other words, the example implementation of FIG. 2 illustrates the utilization of the downlink (DL) sensing reference signal and DL PRS transmission from the TRP.

The network entity (e.g., LMF, location server, and/or sensing server) can be configured to provide DL sensing reference signal 215 configuration to a BS (not shown). The DL sensing reference signal may not be configured to the UE device. In other words, in this example implementation the source and/or configuration of the sensing reference signal is controlled by the network. For example, the four (4) TRPs 205-7, 205-8, 205-12, 205-13 in the sensing region 210 can be generating and signaling a DL sensing reference signal 215 (or signals) and the TRPs 205-1 to 205-6, 205-9 to 205-11, 205-14, 205-15 outside of the sensing region 210 can be generating and signaling a DL position reference signal 220 (or signals).

In an example implementation, the sensing reference signal 215 configuration may not only correspond to the UE. For example, the TRP may sense not only the UE device but other moving objects (e.g., vehicles) including a user (e.g., a human) and/or stationary objects (e.g., a tree) to estimate the objects' location. The network entity may request a BS to transmit DL sensing reference signals 215 from specific TRPs 205-1 to 205-15 (e.g., a subset of TRPs 205-1 to 205-15), where the TRPs 205-7, 205-8, 205-12, 205-13 are located in the sensing region 210 to UE 131. In an example implementation, the TRPs 205-1 to 205-15 (e.g., a subset of TRPs 205-1 to 205-15) with a distance that is less than a threshold distance from the UE 131, the network entity can request the BS to perform sensing of the UE 131 by using the identified TRPs 205-1 to 205-15 (e.g., a subset of TRPs 205-1 to 205-15). The threshold distance can be configured based on carrier frequency, transmission power, fading environment around the UE 131, and the like.

The distance from the UE 131 to a given TRP may, for example, be calculated using an estimated location and/or past location estimate of the UE 131. The network entity may request the BS to transmit DL positioning reference signals 220 from specific TRPs 205-1 to 205-15 (e.g., a subset of TRPs 205-1 to 205-15), where the TRPs 205-1 to 205-6, 205-9 to 205-11,205-14, 205-15 are located outside of the sensing range to the UE 131. The BS can be configured to report measurements from DL sensing reference signals 215 such as round-trip time (RTT) based on the first arrival signal path. In an example implementation, the UE 131 can be configured to report measurements from DL positioning reference signals 220.

Figure 3:
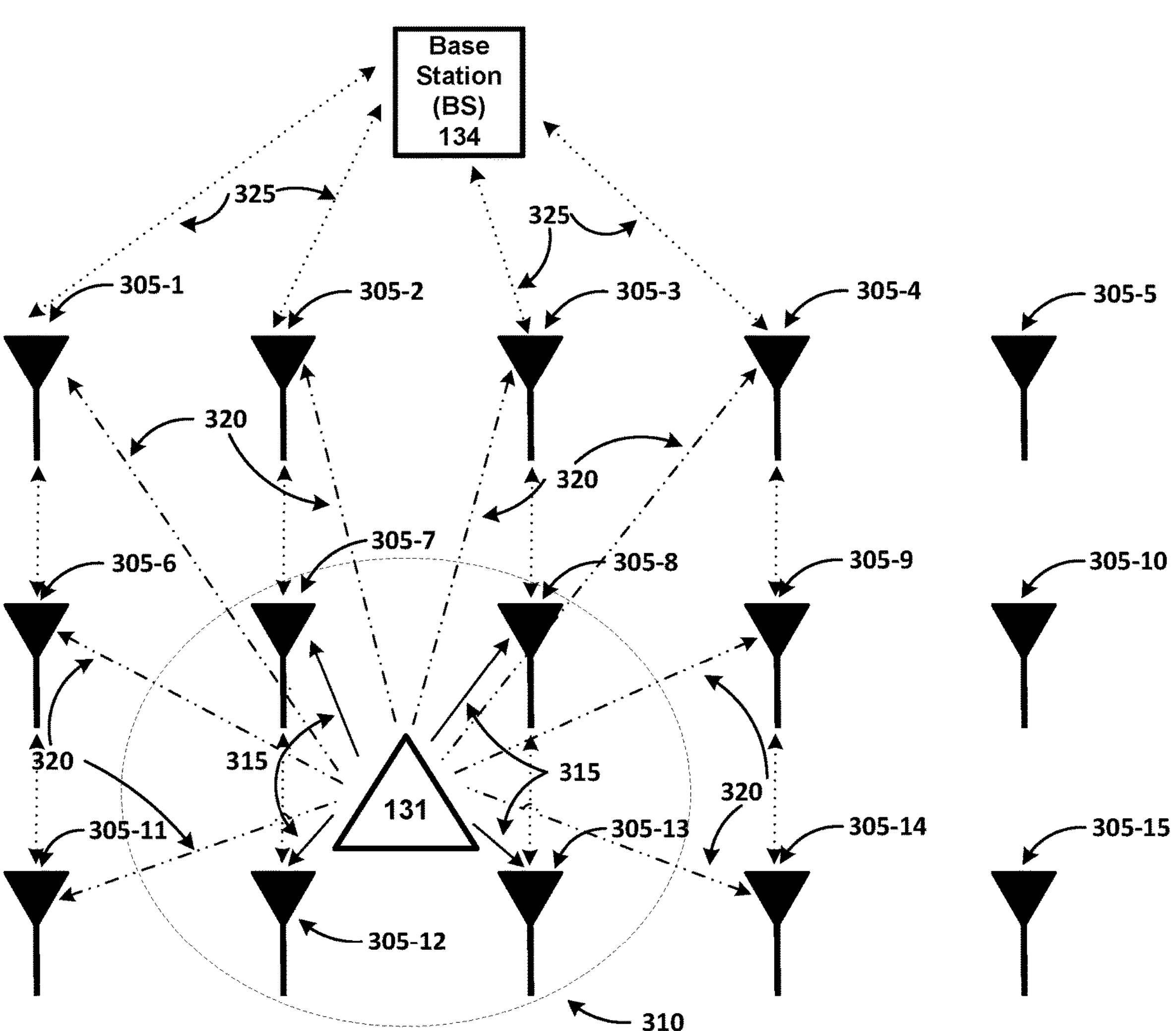
FIG. 3 is another diagram illustrating a joint sensing and positioning wireless communication network according to an example embodiment.

FIG. 3 is another diagram illustrating a joint sensing and positioning wireless communication network according to an example embodiment. As shown in FIG. 3, the wireless communication network includes a plurality of transmission reception points (TRPs) 305-1 to 305-15 servicing the UE 131. The UE 131 is illustrated as being in a sensing region 310 shown as including (but not limited to) four (4) TRPs 305-7, 305-8, 305-12, 305-13. FIG. 3 can illustrate a joint sensing and positioning based on uplink sensing reference signals and uplink positioning reference signal 320 transmission (e.g., Sounding Reference Signals (SRS)) from the UE 131. In other words, the example implementation of FIG. 3 uses an uplink sensing reference signal 315 and an uplink positioning reference signal 320 (e.g., SRS) transmission from the UE 131.

The network entity (e.g., LMF, location server, and/or sensing server) can be configured to provide uplink sensing reference signal 315 configuration to the UE 131. The network entity can be configured to request the UE 131 to transmit the uplink sensing reference signals 315 to specific TRPs 305-7, 305-8, 305-12, 305-13 located in sensing region 310 (e.g., a sensing range). The network entity may indicate the UE 131 to report the measurements from uplink sensing reference signals 315. For example, the network entity may cause the UE 131 to report measurements from uplink sensing reference signals 315 such as round-trip time (RTT) and/or received signal power. For example, the measurement(s) may be reported for a specific sensing RS ID. For example, the measurement(s) may be associated with sensing RS ID and possibly measurements for multiple sensing RS IDs can be reported.

The network entity may configure the criterion on reporting measurements. For example, the UE 131 can be configured to report sensing measurements such as the round-trip time (RTT) and/or the received signal power if the received signal power is greater than a threshold power (e.g., −90) dBm. The received signal can be the reflected signals of the transmitted sensing signal. That is, the sensing reference signal measurement may work so that the UE 131 (or some other entity performing the sensing measurement) transmits the sensing reference signal 315. The sensing reference signal 315 may reflect (e.g., such as radar signals) from the measured entity or entities. In the example of FIG. 3, the sensing reference signal 315 may at least reflect from TRPs 305-7, 305-8, 305-12-305-13 which are inside the sensing region 310. The UE 131 may further be configured to measure the reflections and thus obtain sensing reference signal measurements. In another embodiment, it may be that another UE or entity transmits the sensing reference signal, but the UE 131 measures the sensing reference signals transmitted by the other UE or entity. For this purpose, the configuration of the sensing reference signal of another UE is provided to the UE 131.

The network entity may be configured to request the UE 131 to transmit the uplink positioning reference signals 320 to other TRPs 305-1 to 305-15 or a subset of TRPs 305-1 to 305-15 (e.g., to at least some of the TRPs 305-1 to 305-6, 305-9 to 305-11, 305-14, 305-15 which are outside the sensing region 310). The network entity may be configured to request the UE 131 to transmit the uplink sensing reference signal 315 and and/or the uplink positioning reference signal 320 based on the accuracy requirement and/or the number of detectable TRPs by sensing. So, for example, the UE 131 may be configured to transmit uplink PRS only to TRPs 305-1 to 305-15 which have been detected with uplink sensing measurement (e.g., a subset of TRPs 305-1 to 305-15).

In an example implementation, the network entity may only request sensing reference signal measurements from the UE 131 if the network entity expects localization accuracy is sufficient by sensing reference signal measurements. When the UE 131 transmits sensing reference signals 315 and performs measurements for the transmitted sensing reference signal 315, BS 134 processing for measurement and reporting can be minimized.

In an example implementation, the UE 131 can switch mode from joint mode (transmission of the uplink sensing reference signal 315 and UL PRS; can be referred to also as joint use mode) to the sensing only mode. In other words, the UE 131 can be configured to stop transmitting or refrain from transmitting uplink positioning reference signals 320 if a criterion is met. For example, the criterion can be configured from the BS 134 or another network device, such as from LMF or sensing server. In an example implementation, the criterion can be that if the received power of the sensing reference signal 315 is greater than or equal to a threshold, the UE 131 can be configured to only rely on the sensing measurements and the UE 131 can report sensing reference signal measurements and the UE 131 does not transmit UL PRS at all (at least for a certain time period) or stops transmitting UL PRS. Additional criteria may be that a received power of at least a threshold number of sensing reference signal 315 needs to be greater than or equal to a threshold to stop or to refrain from transmitting UL PRS. So, for example, if only one (or some other threshold number or less) sensing reference signal 315 exceeds the threshold for received power, the UE 131 may continue or start transmitting UL PRS. But if x (e.g., x=2, or x=3, or x=4, or . . . x=N, where N is positive integer number) number of sensing reference signals 315 are measured with power exceeding the threshold, the UE 131 may stop or refrain from transmitting the UL PRS. In another example implementation, if the UE 131 can obtain a predetermined number of sensing reference signal measurements which is greater than a threshold power (e.g., >0) dBm, the UE 131 can be configured to report sensing reference signal measurements and the UE 131 can be configured to not transmit UL PRS. The network entity may request the UE 131 to transmit uplink sensing reference signals 315 to the target TRPs 305, where the TRPs 305-7, 305-8, 305-12, 305-13 are located in the sensing region 310. For example, for the TRPs 305 whose distance is less than a threshold distance from the UE 131, the network entity can be configured to request the UE 131 to perform measurements by sending sensing reference signal 315 to those TRPs 305. The threshold distance can be configured based on frequency carrier, directional beam gain, transmission power, fading environment around the UE 131, TRP size/volume, and/or the like.

In an example, the UE 131 can switch mode from sensing only mode to joint mode. In other words, the UE 131 can be configured to start transmitting uplink positioning reference signals 320 if said criterion is not met. The UL PRS may be transmitted according to a configuration from the network entity. For example, if the received power of the sensing reference signal 315 is less than described threshold, the UE 131 can be configured to start transmitting or continue transmitting UL PRS in addition to performing sensing measurements. For example, if a received power of at least a threshold number of sensing reference signal 315 is not greater than or equal to the threshold, the UE 131 may start or continue UL PRS transmission.

As will be later discussed in more detail, the switching between modes can be realized by using a mode switching configuration preconfigured at the UE 131 or received from the network entity by the UE 131, for example. For example, the mode switching configuration may indicate and/or comprise the threshold for received power of the sensing reference signal and/or indicate the threshold number for sensing measurements (i.e., how many sensing measurements need to be equal to or greater than the threshold). In other words, the mode switching configuration may indicate the UE 131 to determine when to use sensing (transmit and measure sensing signals) only and when to use sensing and positioning (transmit UL PRS and/or receive DL PRS).

Instead of or in addition to using received signal power (or receive power), the threshold could be for received signal quality or a combination of power and quality. In addition, the threshold could be for the received signal power and/or quality of the first arrival path of the received sensing reference signal.

Above example is related to refraining or stopping UL PRS transmission based on sensing measurements exceeding a threshold power or quality. This enables the network (and UE) to save resources as UL PRS resources may be saved. For example, the UE 131 may stop or refrain using UL PRS resources already configured to the UE 131 or it may not even receive indication of said resources from the network entity (e.g., LMF or location server). For example, the network entity may not provide UL PRS configuration to the UE 131 based on sensing measurements reported to the network entity by the UE 131. The network entity may use similar or same criteria (i.e., as UE uses for determining whether to be in joint use mode or sensing only mode) for determining whether or not the UL PRS configuration is required by the UE. As discussed, if UL PRS configuration has not yet been provided to the UE 131, the network entity may determine to not provide the UL PRS configuration if the sensing measurements are deemed to be enough for positioning (i.e., the sensing measurement(s) exceed the threshold (e.g., are equal to or above the threshold)), or the network entity may determine to not provide the UL PRS configuration if the network entity can achieve target positioning accuracy by using the sensing measurements. If the configuration has already been provided, the network entity may indicate to the UE 131 and/or TRP(s) 305-1 to 305-15 that the configuration is no longer valid. Thus, the TRP(s) may also stop listening to UL PRSs transmission from the UE 131. However, if the sensing measurements are not deemed to be enough for positioning, the network entity may be triggered to provide (i.e., if not already provided) the UL PRS configuration to UE 131 and TRP(s) 305.

In a yet another embodiment, the sensing measurements received by the network entity may cause the network entity to change UL PRS configuration. For example, such change may comprise changing interval of UL PRS transmissions, changing bandwidth of UL PRS transmission(s) and/or changing power of UL PRS transmission(s). The change may be signaled to the UE 131 and/or to TRPs 305. Thus, the sensing measurements may be used, in general, to modify the UL PRS transmission.

Although examples of FIG. 3 were discussed in relation to UL PRS configuration and transmission, it is possible that the PRS configuration is for DL PRS reception/measurement. Thus, similarly, the DL PRS reception may be controlled using the sensing measurement. In another embodiment, UE 131 may be configured to both transmit UL PRS and receive downlink PRS. Therefore, the sensing measurement may be used to control one or both of UL PRS transmission and downlink PRS measurement.

Figure 4A:
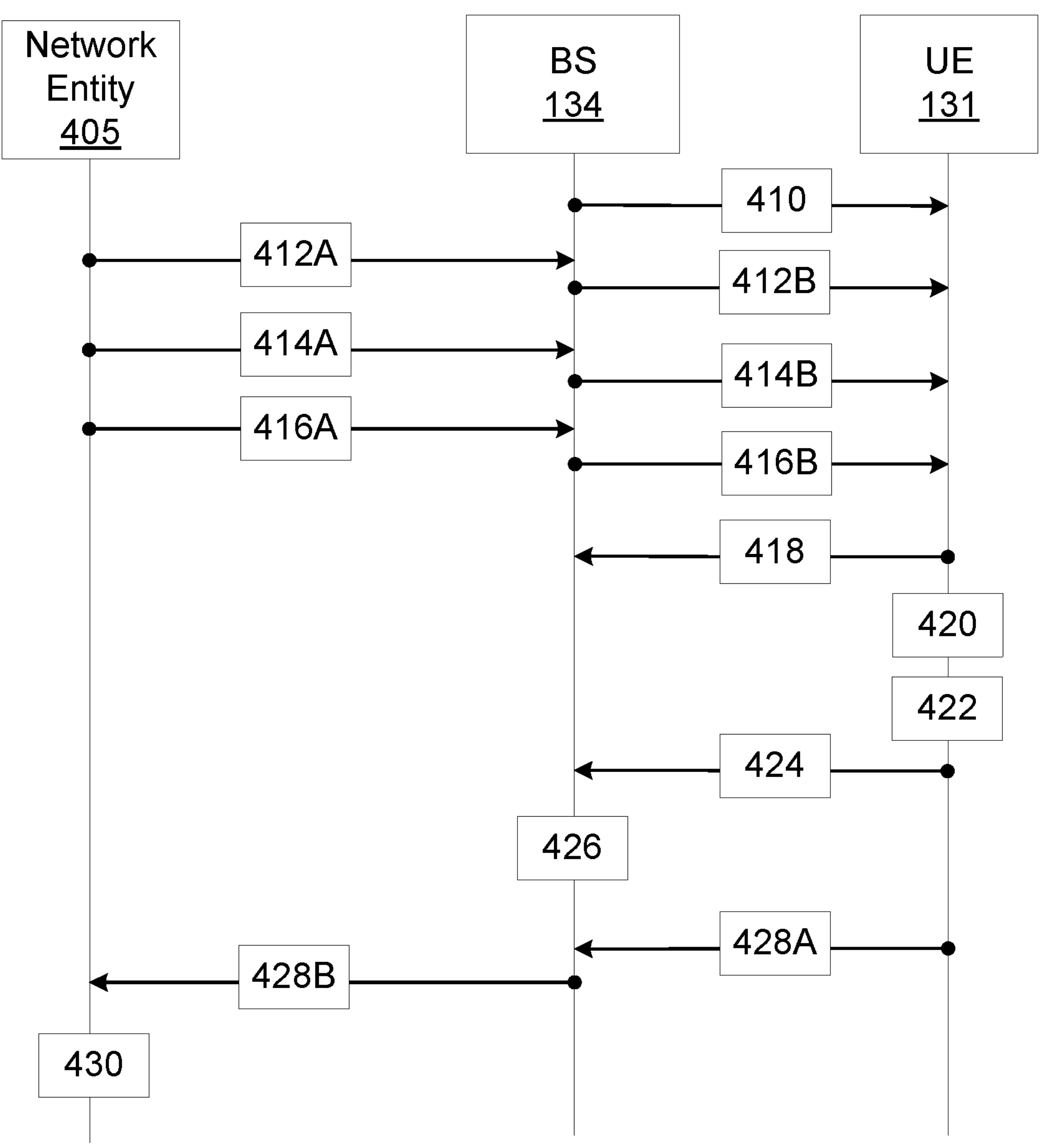
FIG. 4A is a signal flow diagram according to an example embodiment.

FIG. 4A is a signal flow diagram according to an example embodiment. As shown in FIG. 4A, a network includes the user equipment (UE) 131, the BS 134, and a network entity 405 (e.g., a LMF, location server, and/or sensing server). In an example implementation, the network entity 405 can communicate with the UE 131 via BS 134. The BS 134 can be a combination of devices. For example, the BS 134 can represent a BS and a core network device (or entity), the BS 134 can represent a BS and a control device (or entity), the BS 134 can represent a base station onboard a satellite, a satellite as a repeater and a terrestrial base station, and any other similar combination of network devices. A single device and/or the combination of devices can sometimes be referred to as a device, a system, and/or the like. The UE 131 can be a user device, a user terminal, a mobile device, a stationary device, an internet of things (IoT) device, any wirelessly (or cellular) connected device, and/or the like.

The BS 134 can communicate (e.g., wirelessly communicate) a message (block 410) that is received by the UE 131. The message can include information associated with a UL positioning reference signal(s) (UL PRS) configuration (e.g., SRS for positioning purposes). The network entity 405 can communicate (e.g., wirelessly communicate) a message (block 412A) that is received by the BS 134. The BS 134 can communicate (e.g., wirelessly communicate) a message (block 412B) that is received by the UE 131. In this implementation, the message is generated by the network entity 405 and communicated to the UE 131 via the BS 134. The message can include information associated with a UL sensing reference signal(s) configuration. The network entity 405 can communicate (e.g., wirelessly communicate) a message (block 414A) that is received by the BS 134. The BS 134 can communicate (e.g., wirelessly communicate) a message (block 414B) that is received by the UE 131. In this implementation, the message is generated by the network entity 405 and communicated to the UE 131 via the BS 134. The message can include information associated with the sensing measurement(s) reporting criterion configuration. The network entity 405 can communicate (e.g., wirelessly communicate) a message (block 416A) that is received by the BS 134. The BS 134 can communicate (e.g., wirelessly communicate) a message (block 416B) that is received by the UE 131. In this implementation, the message is generated by the network entity 405 and communicated to the UE 131 via the BS 134. The message can include information associated with a sensing measurement only mode switching criterion configuration. In sensing measurement only mode the UE 131 may not transmit UL PRS and can transmit/measure the UL sensing Reference Signal (RS).

The UE 131 can transmit (block 418) an UL sensing RS. In block 420, the UE 131 can perform measurements for UL sensing RS. For example, the UE 131 can perform measurements on the reflections of the reference signal that are received back at the UE. In block 422, if the switching criterion (e.g., received from network entity 405 or preconfigured at the UE) on sensing measurement only mode is satisfied (see FIG. 4B if not satisfied), the UE 131 transmits sensing RS only. For example, if the UE 131 determines that UE 131 should be in sensing measurement only mode UE 131 may not transmit the UL PRS and continues to transmit the UL sensing RS (e.g., in periodic fashion) and then reports the sensing measurements to the network entity 405. If the UE 131 determines that UE 131 should be in sensing plus positioning mode (i.e., joint use mode) UE 131 can then also transmit the UL PRS according to the configuration received from the BS 134. As discussed herein, in some cases UL PRS transmission may be replaced by or supplemented with DL PRS reception. However, in sensing only mode, the UE 131 may be configured not to transmit UL PRS or receive DL PRS. In another implementation, in sensing only mode, the UE 131 may be configured to not report DL PRS measurement, and the UE 131 may be configured to transmit sensing reference signal and perform sensing measurement.

The UE 131 can transmit (block 424) an UL PRS and/or UL sensing RS. In block 426, the BS 134 performs measurement for UL PRS. The UE 131 can communicate (e.g., wirelessly communicate) a message (block 428A) that is received by BS 134. The BS 134 can communicate (e.g., wirelessly communicate) a message (block 428B) that is received by network entity 405. In this implementation, the message is generated by the UE 131 and communicated to the network entity 405 via the BS 134. The message can include sensing measurements according to the configuration received. In block 430, the network entity 405 estimates UE location.

Figure 4B:
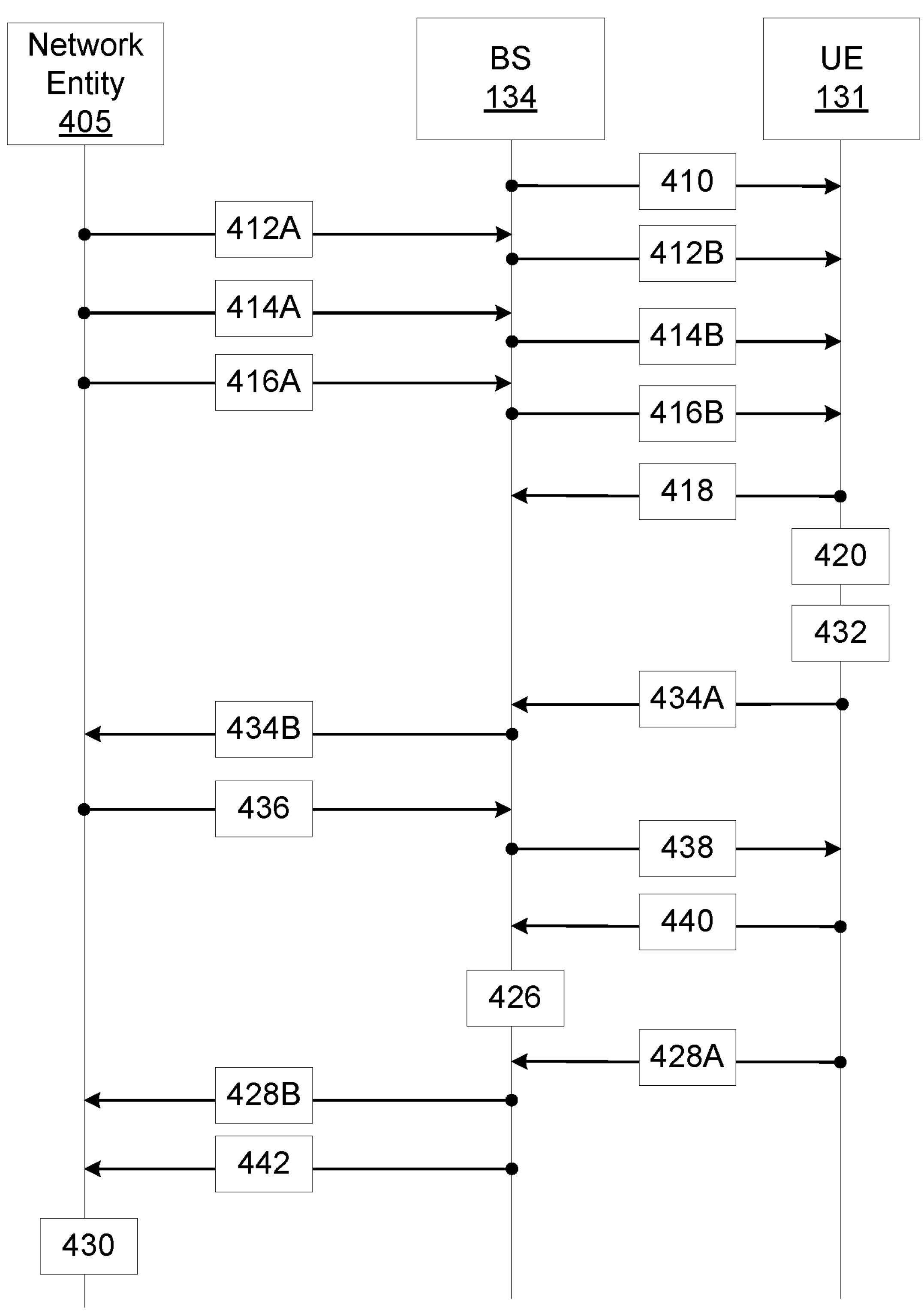
FIG. 4B is another signal flow diagram according to an example embodiment.

FIG. 4B is another signal flow diagram according to an example embodiment. In block 432, if the switching criterion on sensing measurement only mode is not satisfied (see FIG. 4A if satisfied), the UE 131 may use UL PRS in addition to the sensing RS. The UE 131 can communicate (e.g., wirelessly communicate) a message (block 434A) that is received by BS 134. The BS 134 can communicate (e.g., wirelessly communicate) a message (block 434B) that is received by network entity 405. In this implementation, the message is generated by the UE 131 and communicated to the network entity 405 via the BS 134. The message can include a request for a UL PRS configuration. The network entity 405 can communicate (e.g., wirelessly communicate) a message (block 436) that is received by the BS 134. The message can include a request for the BS 134 to configure UL PRS to the UE 131 and to request the BS 134 to report UL PRS measurements.

The BS 134 can communicate (e.g., wirelessly communicate) a message (block 438) that is received by the UE 131. The message can include a UL positioning reference signal(s) (UL PRS) configuration. The UE 131 can transmit (block 440) an UL PRS. The BS 134 can communicate (e.g., wirelessly communicate) a message (block 442) that is received by the network entity 405. The message can include a UL PRS measurement(s) report.

An alternative (or additional) example implementation for FIGS. 4A and 4B can be that the BS 134 does not configure the UL PRS (e.g., SRS for positioning purposes) in the block 410 and instead waits until the UE 131 has determined if UE 131 is to be in a joint use mode of the uplink sensing reference signals and uplink positioning reference signals. There are two alternatives for how the UE 131 can indicate to the network entity 405 that UE 131 should be in the joint use mode. In a first example implementation, the UE 131 can be configured to implicitly inform the network entity 405 that UE 131 should be in sensing plus positioning mode by reporting the sensing measurements and the network can determine that only a certain number of measurements are reported or that a certain number of measurements meet the criteria. In the first example implementation, the network entity 405 can be configured to determine if the UL PRS configuration is additionally necessary or not. For example, the network entity 405 may consider measurement quality for the reported measurements. If the network entity 405 cannot estimate UE 131 location with the desired accuracy, the network entity 405 can be configured to request the BS 134 to configure UL PRS. However, in this example, the UE 131 should report all DL PRS measurements.

In a second example implementation, the UE 131 can be configured to explicitly inform the network entity 405 that the network entity 405 should be in sensing plus positioning mode by sending a new message that informs the network entity 405 to be in joint use mode (i.e., both sensing measurement and positioning reference signal transmission and/or reception). In the second example implementation, the UE 131 can be configured to directly determine if the UL PRS configuration is additionally necessary or not. For example, the UE 131 can be configured to send a message to the network entity 405 to report that sensing measurements are not enough to estimate the UE location. Then, the network entity 405 can be configured to request the BS 134 to provide the UE 131 with the UL PRS configuration, and the network entity 405 can be configured to request the BS 134 to report measurements from UL PRS transmitted by the UE 131.

For example, the UE 131 can be configured to send a message to the BS 134 to request UL PRS configuration. In this example, the network entity 405 may not expect to receive measurements for UL PRS, but the network entity 405 may receive measurements from UL PRS by the BS 134. After the network entity 405 receives this indication (either explicitly or implicitly) the network entity 405 can be configured to configure the UE 131 with the UL PRS and then the flow follows that of FIG. 4A or 4B.

Figure 5:
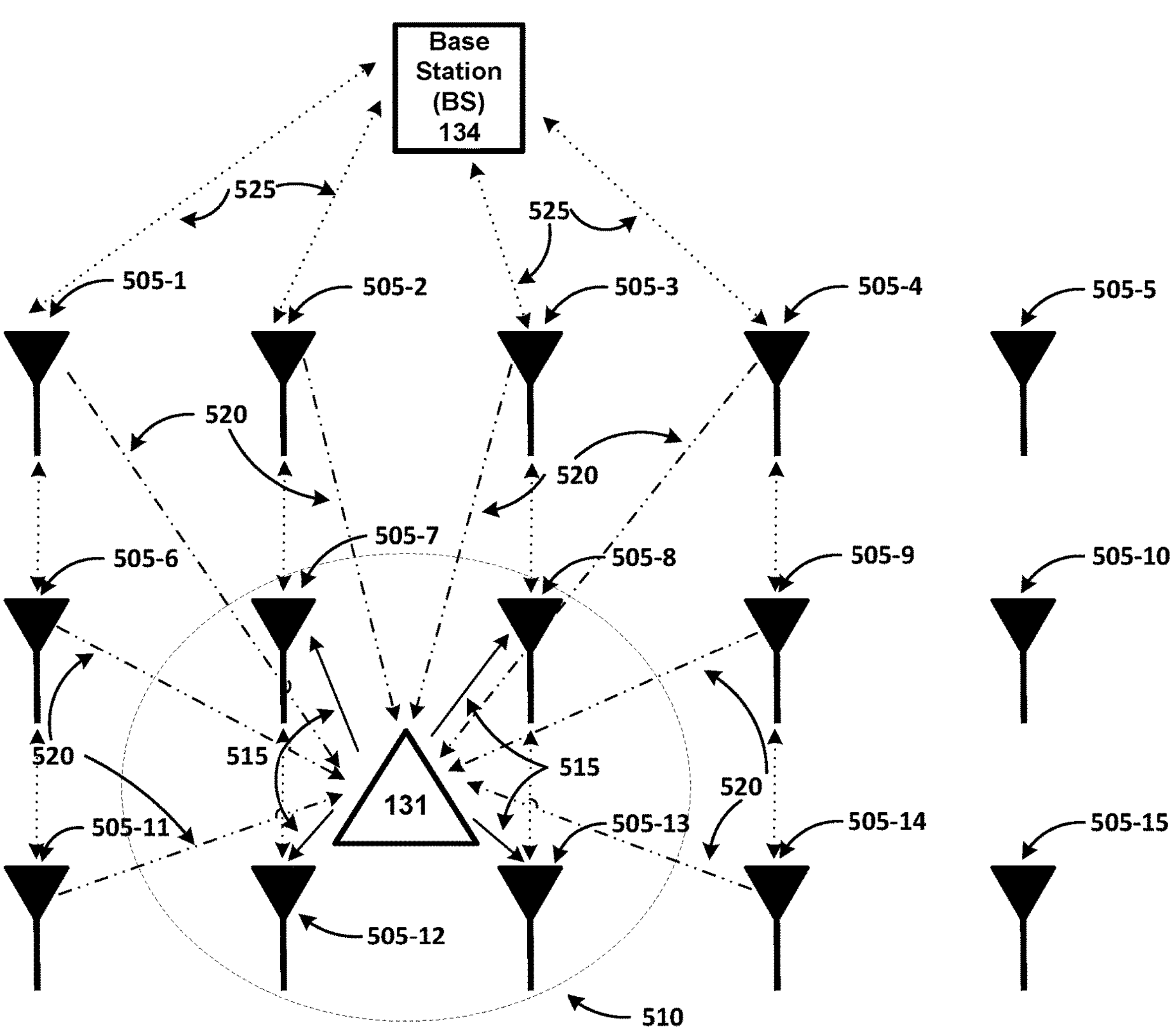
FIG. 5 is yet another diagram illustrating a joint sensing and positioning wireless communication network according to an example embodiment.

FIG. 5 is yet another diagram illustrating a joint sensing and positioning wireless communication network according to an example embodiment. As shown in FIG. 5, the wireless communication network includes a plurality of transmission reception points (TRPs) 505-1 to 505-15 servicing the UE 131. The UE 131 is illustrated as being in a sensing region 510 shown as including (but not limited to) four (4) TRPs 505-7, 505-8, 505-12, 505-13. FIG. 5 can illustrate a sensing and positioning with uplink sensing reference signal 515 and downlink positioning reference signal 520. The example implementation of FIG. 5 uses an uplink sensing reference signal 515 transmission from the UE 131 and the downlink PRS transmission from the BS 134. The UE 131 measures the RSRP (Reference Signal Received Power) of the downlink positioning reference signal 520 or measures the RSRPP (Reference Signal Received Power per Path) of the first arrival path of the downlink positioning reference signal 520 from multiple TRPs 505.

The network entity (e.g., LMF, location server, and/or sensing server) can be configured to provide uplink sensing reference signal 515 configuration to the UE 131. The network entity can be configured to request the UE 131 to transmit the uplink sensing reference signals 515 to specific TRPs 505-7, 505-8, 505-12, 505-13 located in sensing region 510 (e.g., a sensing range). The network entity may indicate the UE 131 to report the measurements from sensing reference signals 515. For example, the network entity may cause the UE 131 to report measurements from sensing reference signals 515 such as round-trip time (RTT) for a specific sensing RS ID.

The UE 131 can be configured to report a list of detectable TRPs 505 for sensing based on the downlink positioning reference signal 520 measurements such as RSRP or RSRPP. The UE 131 can be configured to select TRPs 505-1 to 505-15 (e.g., a subset of TRPs 505-1 to 505-15) which are detectable by sensing based on predetermined criteria. For example, the network entity may indicate UE 131 to select the detectable TRPs 505 if the RSRPP of the first arrival path of the positioning reference signal 520 is greater than a threshold power dBm. The network entity may pre-calculate threshold value considering the transmission power, carrier frequency, directional beam gain, distance between a TRP and a UE 131, and/or the like.

The network entity can be configured to provide sensing reference signal 515 configuration to the UE 131. The sensing reference signal 515 may not be configured to the BS 134. The network entity may indicate UE 131 to report the measurements from sensing reference signals 515. For example, round-trip time (RTT) for a specific sensing RS ID. The network entity may configure the criterion on reporting. For example, the UE 131 should report sensing measurements if the received power is greater than a threshold power (e.g., −90) dBm.

The UE 131 may be configured to switch mode from joint use mode (e.g., transmission of the sensing reference signal 515 and reporting of DL PRS measurement) to the sensing-only mode. In an example implementation, the joint use of the DL PRS and sensing reference signal 515 can include the UE 131 measures DL PRS and the UE 131 can be configured to obtain measurements such as RSTD and RSRP. Also, UE 131 can be configured to transmit the configured uplink sensing reference signal 515 and obtain measurements from sensing reference signal 515. The UE reports sensing measurements to the network entity.

In an example implementation, the sensing only mode can include the UE 131 being configured to not report any measurements obtained from the DL PRS. However, the UE 131 can be configured to transmits sensing reference signal 515 and obtains measurement for sensing reference signal 515. Also, the UE 131 can be configured to report the sensing measurements such as RTT and signal strength.

In an example implementation, mode switching can be used if the sensing-only mode is not enough to estimate the UE 131 location with the desired accuracy. For example, the UE 131 can be configured to select the joint mode. However, if the sensing-only mode is enough, the UE 131 can be configured to select sensing-only mode (e.g., the sensing-only mode can save resource overhead). The BS 134 or the network entity can be configured to configure criterion to check if the obtained sensing measurements are enough to estimate the UE location. In other words, the UE 131 can be configured to stop reporting of the DL PRS measurements (e.g., RSTD, RSRP obtained from DL PRS) if a certain criterion is met. For example, the criterion can be configured from the BS 134 or the network entity.

An example criterion can be that if the received power of the sensing reference signal 515 is greater than a predetermined threshold, the UE 131 can rely on the sensing measurements. Therefore, the UE 131 can be configured to report sensing measurements and the UE 131 can be configured to stop reporting of DL PRS measurements. As another example, if the UE 131 can obtain a predetermined number of sensing measurements which is greater than a threshold power dBm, the UE 131 can be configured to report sensing measurements and the UE 131 may not transmit UL PRS. The network entity may request the UE 131 to transmit uplink sensing reference signals 515 to the target TRPs 505, where the TRPs 505-7, 505-8, 505-12, 505-13 are located in a sensing region 510. For example, for the TRPs 505-1 to 505-15 (e.g., a subset of TRPs 505-1 to 505-15) whose distance is less than a threshold distance from the UE 131, the network entity can be configured to request the UE 131 to perform measurement by sending sensing reference signal 515 to those TRPs 505. The threshold distance can be configured based on frequency carrier, directional beam gain, transmission power, fading environment around the target UE, TRP size/volume, and/or the like.

Figure 6:
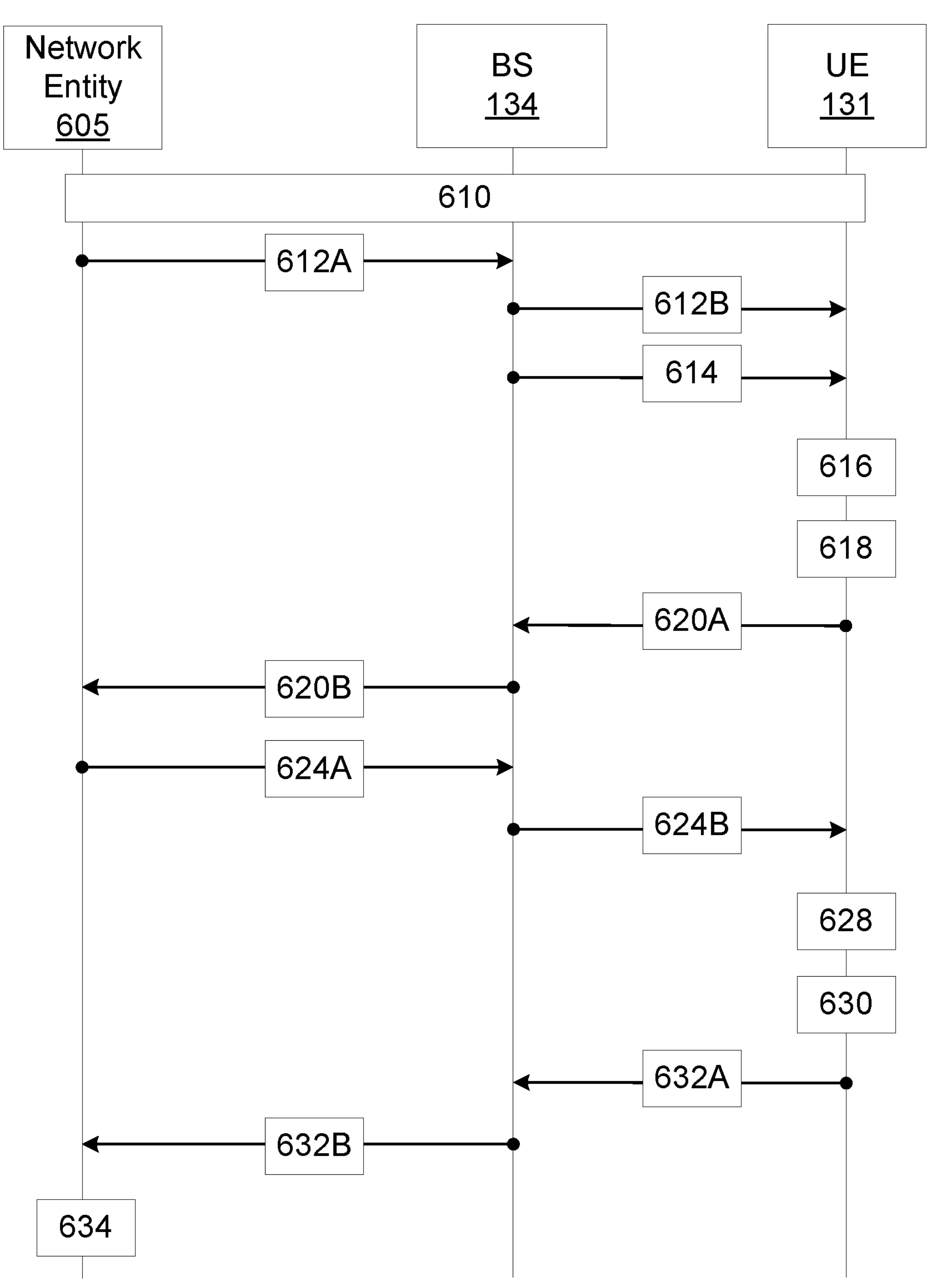
FIG. 6 is yet another signal flow diagram according to an example embodiment.

FIG. 6 is another signal flow diagram according to an example embodiment.

As shown in FIG. 6, a network includes the user equipment (UE) 131, the BS 134, and a network entity 605 (e.g., a LMF, location server, and/or sensing server). The BS 134 can be a combination of devices. For example, the BS 134 can represent a BS and a core network device (or entity), the BS 134 can represent a BS and a control device (or entity), the BS 134 can represent a base station onboard a satellite, a satellite as a repeater and a terrestrial base station, and any other similar combination of network devices. A single device and/or the combination of devices can sometimes be referred to as a device, a system, and/or the like. The UE 131 can be a user device, a user terminal, a mobile device, a stationary device, an internet of things (IoT) device, any wirelessly (or cellular) connected device, and/or the like.

In block 610, the network entity 605 can provide the UE 131 and the BS 134 with a DL positioning reference signals (DL PRS) configuration. For example, the network entity 605 can configure PRS to the UE 131 and the BS 134. The network entity 405 can communicate (e.g., wirelessly communicate) a message (block 612A) that is received by the BS 134. The BS 134 can communicate (e.g., wirelessly communicate) a message (block 612B) that is received by the UE 131. In this implementation, the message is generated by the network entity 405 and communicated to the UE 131 via the BS 134. The message can include a criterion to select detectable TRPs by using sensing RS configuration (i.e., TRPs that are assumed to be detectable or are detectable by using sensing signals as described herein). The BS 134 can transmit (block 614) an DL PRS. In block 616, the UE 131 performs measurements for DL PRS. In block 618, the UE 131 determines a list of detectable TRPs by sensing. The UE 131 can communicate (e.g., wirelessly communicate) a message (block 620A) that is received by BS 134. The BS 134 can communicate (e.g., wirelessly communicate) a message (block 620B) that is received by network entity 405. In this implementation, the message is generated by the UE 131 and communicated to the network entity 405 via the BS 134. The message can include a list of TRPs (list herein may comprise one or more TRPs depending on how many TPRs are received with a power exceeding a threshold). The network entity 405 can communicate (e.g., wirelessly communicate) a message (block 624A) that is received by the BS 134. The BS 134 can communicate (e.g., wirelessly communicate) a message (block 624B) that is received by the UE 131. In this implementation, the message is generated by the network entity 405 and communicated to the UE 131 via the BS 134. The message can include a UL sensing reference signal(s) configuration and instruction(s) to report sensing measurements. The UE 131 can transmit (block 626) UL sensing RS. In block 628, the UE 131 can perform measurements for UL sensing RS. In block 628, the UE 131 determines if the switching criterion on sensing measurements only mode is satisfied, the UE 131 reports measurements from sensing RS and does not report measurements from DL PRS. The UE 131 can communicate (e.g., wirelessly communicate) a message (block 632A) that is received by BS 134. The BS 134 can communicate (e.g., wirelessly communicate) a message (block 632B) that is received by network entity 405. In this implementation, the message is generated by the UE 131 and communicated to the network entity 405 via the BS 134. The message can include sensing measurements (e.g., RTT, the received signal strength, and/or the like). In block 634, the network entity 605 estimates the UE 131 location.

Depending on the environment around the UEs, the UE may sense/detect another static object in, for example, a factory than the TRPs, and it may report the sensing measurements about the objects. However, the network entity may utilize information on the objects in the factory such as size, radar cross section, and location of the static objects in order to differentiate which objects are detected by the UE. In some situations, the network entity may already know a rough location based on the prior knowledge or cellular-based positioning technique. Therefore, the network entity can be configured to indicate the transmission and reception beam direction. Thus, the network may know the expected range of the obtainable measurements from the UE. The known location of the object to the network entity could be also used to estimate the UE location.

If the UE is the one finding its own location this is called UE-based positioning. In this case the sensing signals can be used to measure the time/angle of the BS(s) which are within the range. Further, the UE may only need to measure the DL PRS on the cells outside of the sensing range.

In an example embodiment, the sensing reference signals (e.g., UL sensing reference signal) is transmitted (e.g., by the UE 131) on a different frequency area (e.g., different CCs, BWPs and frequency layers) than the UL PRS is transmitted or is configured to be transmitted. Similarly, the DL PRS may use different frequency area than the sensing reference signals, but possibly the same frequency area as UL PRS. For example, the sensing reference signal is transmitted on a higher frequency than the UL PRS or DL PRS. For example, the frequency area for transmitting sensing reference signal does not overlap with frequency area for UL PRS or DL PRS. For example, using frequency area that is located on or above 10 GHz or even on or above 100 GHz may be beneficial for detecting entities using sensing reference signals. However, it may be beneficial to use lower frequencies for transmitting PRS to allow better penetration through obstacles.

Some advantages of the described example implementations can be a higher positioning estimation accuracy as the sensing signals do not require time and/or frequency synchronization between UE and TRP. A decreased signaling overhead as the sensing reference signal is not configured to the UE and/or the TRP. Lower computational complexity of the signal processing functions at the TRP and/or the UE. A reduced delay to obtain round trip time measurement than the current NR positioning method using uplink and downlink PRS.

Figure 7:
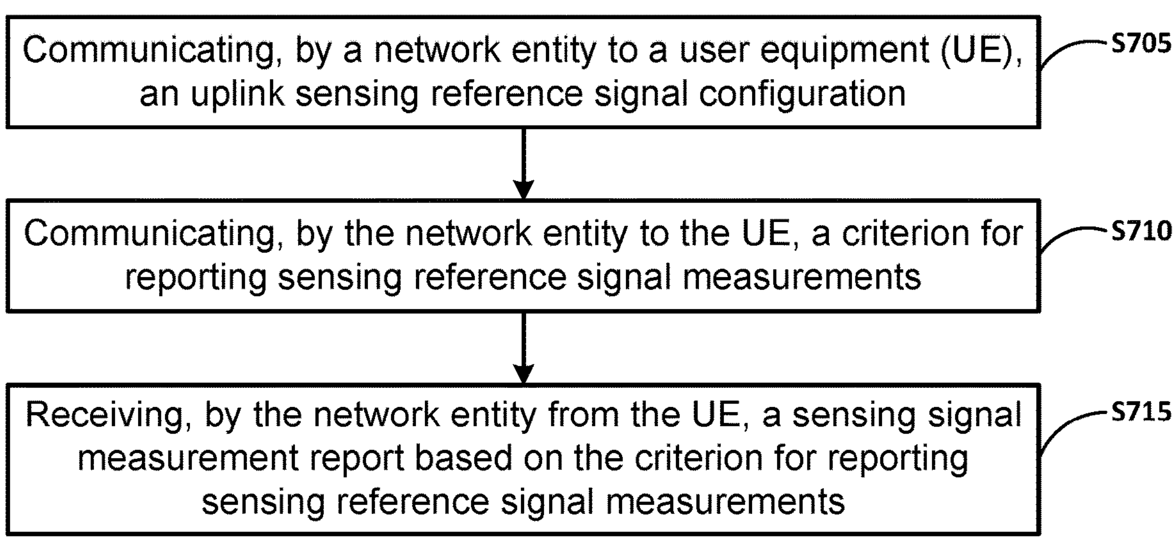
FIG. 7 is a block diagram of a method of operating a network device according to an example embodiment.

Example 1. FIG. 7 is a block diagram of a method of operating a network device according to an example embodiment. As shown in FIG. 7, in step S705 communicating, by a network entity to a user equipment (UE), an uplink sensing reference signal configuration. In step S710 communicating, by the network entity to the UE, a criterion for reporting sensing reference signal measurements. In step S715 receiving, by the network entity from the UE, a sensing signal measurement report based on the criterion for reporting sensing reference signal measurements.

Example 2. The method of Example 1 can further include estimating a location of the UE based on the sensing signal measurement report.

Example 3. The method of Example 1, wherein the criterion for reporting sensing reference signal measurements can include a received power of a downlink positioning reference signal being greater than a threshold power, or a received power of a sensing reference signal being greater than a second threshold power.

Example 4. The method of Example 1, wherein a sensing reference signal measurement can include at least one of a received signal power measurement, or a round trip time measurement between the UE and a Transmission Reception Point (TRP).

Example 5. The method of Example 1 can further include receiving, by the network entity from the UE, uplink positioning reference signals and estimating a location of the UE based on the sensing reference signal measurement report and the uplink positioning reference signal measurement report.

Figure 8:
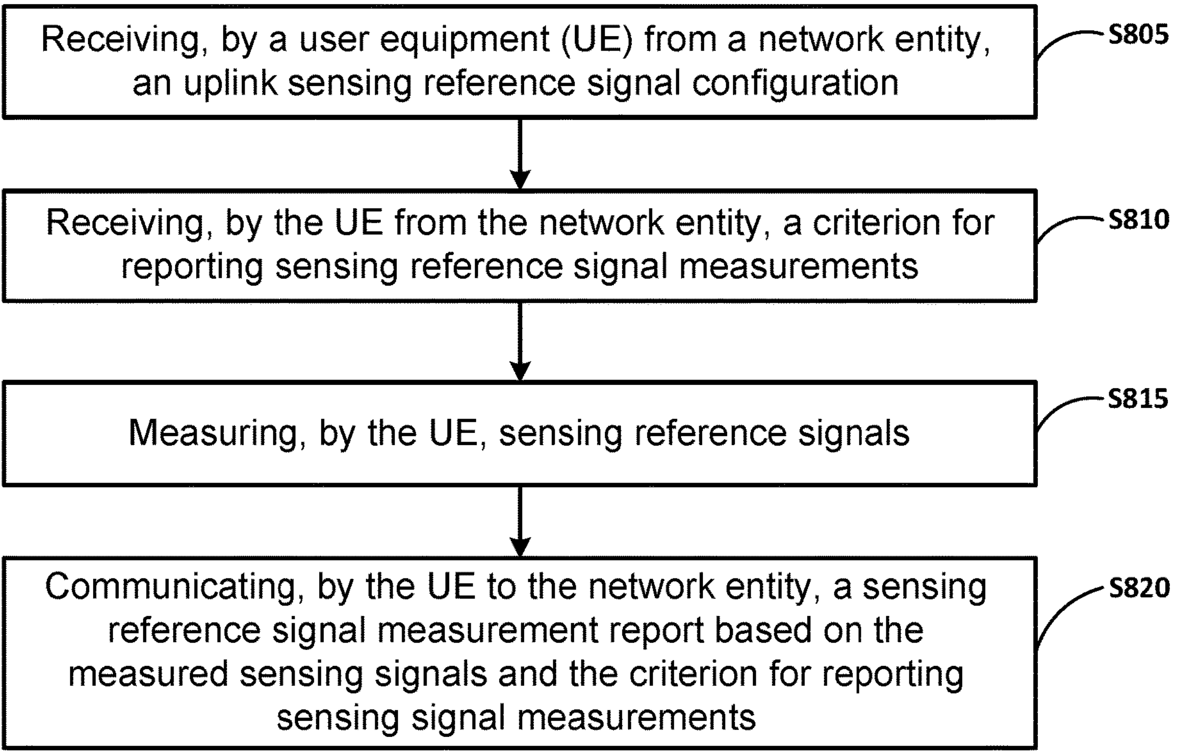
FIG. 8 is a block diagram of a method of operating a user equipment according to an example embodiment.

Example 6. FIG. 8 is a block diagram of a method of operating a user equipment according to an example embodiment. As shown in FIG. 8, in step S805 receiving, by a user equipment (UE) from a network entity, an uplink sensing reference signal configuration. In step S810 receiving, by the UE from the network entity, a criterion for reporting sensing reference signal measurements. In step S815 measuring, by the UE, sensing reference signals. In step S820 communicating, by the UE to the network entity, a sensing reference signal measurement report based on the measured sensing signals and the criterion for reporting sensing signal measurements.

Example 7. The method of Example 6, wherein the criterion for reporting sensing reference signal measurements can include a received power being greater than a threshold power, or a received power of a sensing reference signal being greater than a second threshold power.

Example 8. The method of Example 6, wherein a sensing reference signal measurement can include at least one of a received signal power measurement, or a round trip time measurement between the UE and a Transmission Reception Point (TRP).

Example 9. The method of Example 6 can further include operating the UE in one of a joint use mode or a sensing only mode, wherein the joint use mode includes use of sensing reference signals and at least one of uplink positioning reference signals, or downlink positioning reference signals.

Example 10. The method of Example 9 can further include receiving, by the UE from the network entity, a mode switching criterion configuration and switching between the sensing only mode and the joint use mode based on the mode switching criterion and sensing reference signal measurements.

Example 11. The method of Example 9 can further include receiving, by the UE from the network entity, a mode switching criterion configuration, determining if the UE obtains at least a threshold number of sensing reference signal measurements satisfying a threshold for a received signal power, and based on determining that the at least the threshold number of sensing reference signal measurements satisfying the threshold for the received signal power have been obtained, communicating, by the UE to the network entity, sensing measurements without performing an uplink positioning reference signal transmission, downlink positioning reference signal measurement reporting and/or downlink positioning reference signal measurement.

Figure 9:
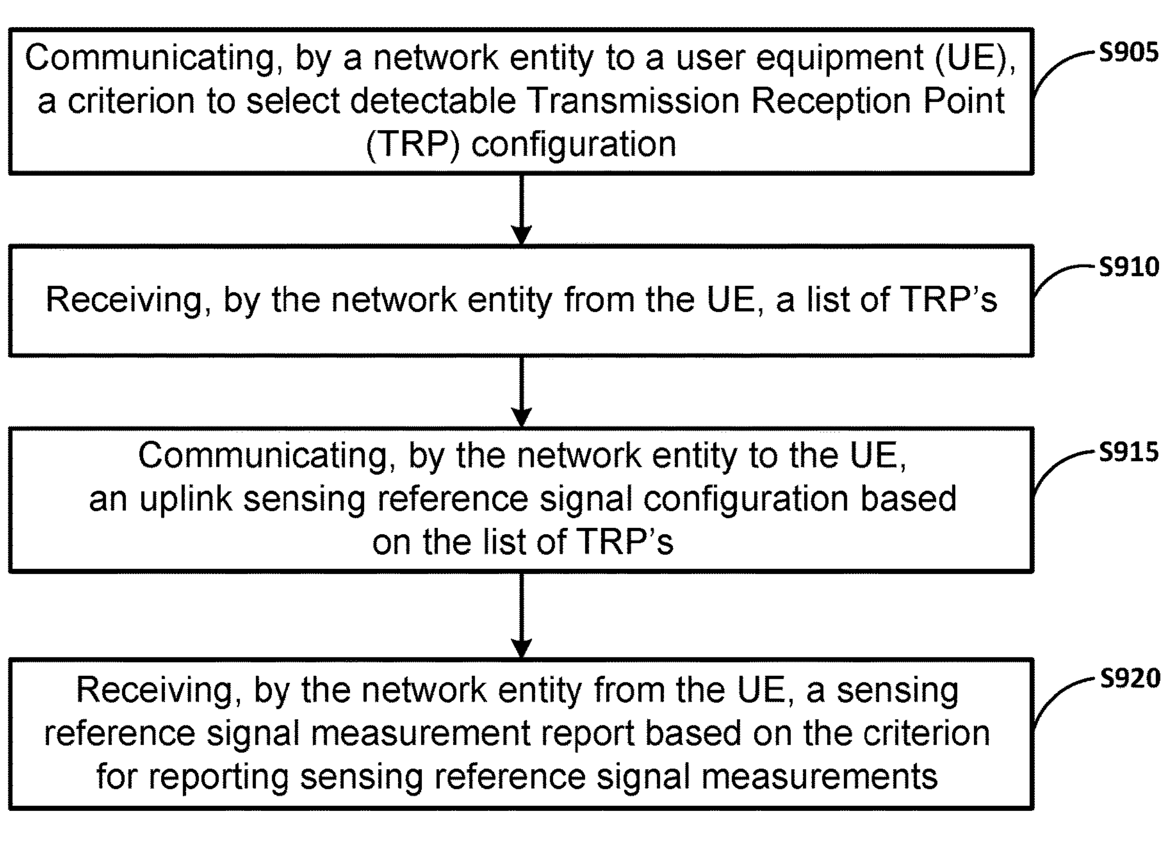
FIG. 9 is a block diagram of a method of operating a network device according to an example embodiment.

Example 12. FIG. 9 is a block diagram of a method of operating a network device according to an example embodiment. As shown in FIG. 9, in step S905 communicating, by a network entity to a user equipment (UE), a criterion to select detectable Transmission Reception Point (TRP) configuration. In step S910 receiving, by the network entity from the UE, a list of TRPs. In step S915 communicating, by the network entity to the UE, an uplink sensing reference signal configuration based on the list of TRPs. In step S920 receiving, by the network entity from the UE, a sensing reference signal measurement report based on the criterion for reporting sensing reference signal measurements.

Example 13. The method of Example 12 can further include estimating a location of the UE based on the sensing reference signal measurement report.

Example 14. The method of Example 12, wherein the criterion for reporting sensing reference signal measurements can include a received power being greater than a threshold power.

Example 15. The method of Example 12, wherein a sensing reference signal measurement can include a round trip time between the UE and a Transmission Reception Point (TRP).

Example 16. The method of Example 12 can further include receiving, by the network entity from the UE, uplink positioning reference signals and estimating a location of the UE based on the sensing reference signal measurement report and the uplink positioning reference signals.

Figure 10:
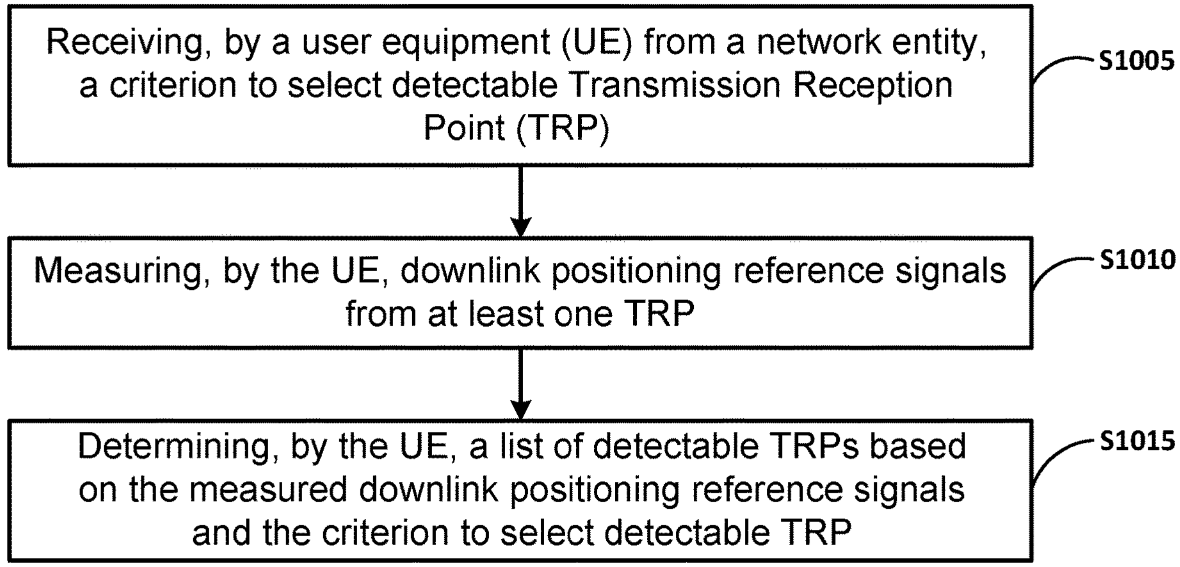
FIG. 10 is a block diagram of a method of operating a user equipment according to an example embodiment.

Example 17. FIG. 10 is a block diagram of a method of operating a network device according to an example embodiment. As shown in FIG. 10, in step S1005 receiving, by a user equipment (UE) from a network entity, a criterion to select detectable Transmission Reception Point (TRP). In step S1010 measuring, by the UE, downlink positioning reference signals from at least one TRP. In step S1015 determining, by the UE, a list of detectable TRPs based on the measured downlink positioning reference signals and the criterion to select detectable TRP. In step S1020 communicating, by the UE to the network entity, the list of detectable TRPs.

Example 18. The method of Example 17 can further include receiving, by the UE from the network entity, an uplink sensing reference signal configuration for detecting at least one TRP on the communicated list of detectable TRPs, measuring, by the UE, sensing reference signals, and communicating, by the UE to the network entity, a sensing reference signal measurement report based on the measured sensing reference signals.

Example 19. The method of Example 17, wherein the criterion for reporting sensing reference signal measurements can include a received power being greater than a threshold power.

Example 20. The method of Example 17, wherein a sensing reference signal measurement can include received signal power, a round trip time between the UE and a Transmission Reception Point (TRP).

Example 21. The method of Example 17 can further include operating the UE in one of a joint use mode or a sensing only mode, wherein the joint use mode can include use of uplink position reference signals and sensing reference signals.

Example 22. The method of Example 21 can further include receiving, by the UE from the network entity, a mode switching criterion configuration and switching between the sensing only mode and the joint use mode based on the mode switching criterion and sensing reference signal measurements.

Example 23. The method of Example 21 can further include receiving, by the UE from the network entity, a mode switching criterion configuration, determining if the UE obtains at least a threshold number of sensing reference signal measurements satisfying a threshold for a received signal power, and based on determining that the at least the threshold number of sensing reference signal measurements satisfying the threshold for the received signal power have been obtained, communicating, by the UE to the network entity, sensing measurements without performing an uplink positioning reference signal transmission, downlink positioning reference signal measurement reporting and/or downlink positioning reference signal measurement.

Example 24. A method can include any combination of one or more of Example 1 to Example 23.

Example 25. A non-transitory computer-readable storage medium comprising instructions stored thereon that, when executed by at least one processor, are configured to cause a computing system to perform the method of any of Examples 1-24.

Example 26. An apparatus comprising means for performing the method of any of Examples 1-24.

Example 27. An apparatus comprising at least one processor and at least one memory including computer program code, the at least one memory and the computer program code configured to, with the at least one processor, cause the apparatus at least to perform the method of any of Examples 1-24.

Example 28. An apparatus comprising: at least one processor; and at least one memory storing instructions that, when executed by the at least one processor, cause the apparatus to: communicate, to a user equipment (UE), a criterion to select detectable Transmission Reception Point (TRP) configuration; receiving, from the UE, a list of TRPs;

communicate, to the UE, an uplink sensing reference signal configuration based on the list of TRPs; and receive, from the UE, a sensing reference signal measurement report based on the criterion for reporting sensing reference signal measurements.

Example 29. The apparatus of Example 28, wherein the instructions, when executed by the at least one processor, cause the apparatus to estimate a location of the UE based on the sensing reference signal measurement report.

Example 30. The apparatus of Example 28, wherein the instructions, when executed by the at least one processor, cause the apparatus to estimate a location of the UE based on the sensing reference signal measurement report.

Example 31. The apparatus of Example 28, wherein the criterion for reporting sensing reference signal measurements includes a received power being greater than a threshold power.

Example 32. The apparatus of Example 28, wherein a sensing reference signal measurement includes a round trip time between the UE and a Transmission Reception Point (TRP).

Example 33. The apparatus of Example 28, wherein the instructions, when executed by the at least one processor, cause the apparatus to: receive, from the UE, uplink positioning reference signals; and estimate a location of the UE based on the sensing reference signal measurement report and the uplink positioning reference signals.

Example 34. An apparatus comprising at least one processor and at least one memory storing instructions that, when executed by the at least one processor, cause the apparatus at least to perform the method of any of Examples 1-24.

Figure 11:
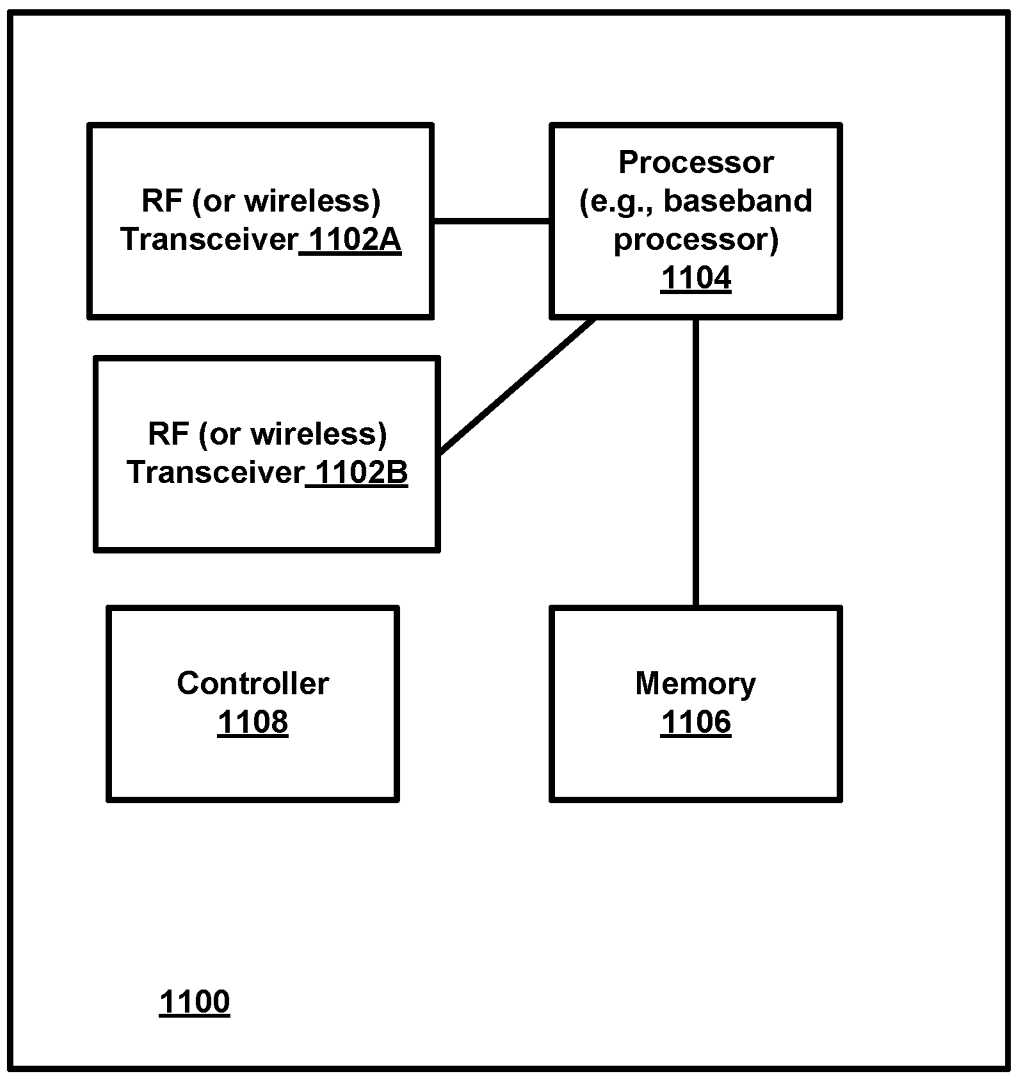
FIG. 11 is a block diagram of a wireless station or wireless node (e.g., AP, BS, gNB, RAN node, relay node, UE or user device, network node, network entity, DU, CU-CP, CU-CP, . . . , or other node) according to an example embodiment.

FIG. 11 is a block diagram of a wireless station 1100 or wireless node or network node 1100 according to an example embodiment. The wireless node or wireless station or network node 1100 may include, e.g., one or more of an AP, BS, gNB, RAN node, relay node, UE or user device, network node, network entity, DU, CU-CP, CU-UP, . . . , or other node according to an example embodiment.

The wireless station 1100 may include, for example, one or more (e.g., two as shown in FIG. 11) radio frequency (RF) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames, or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11, a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1104, or other controller or processor, performing one or more of the functions or tasks described above.

According to another example embodiment, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates. Another example of a suitable communications system is the 6G system. It is assumed that network architecture in 6G will be similar to that of the 5G.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:

at least one processor; and at least one memory storing instructions that, when executed by the at least one processor, cause the apparatus to:

receive, from a network entity, an uplink sensing reference signal configuration;

receive, from the network entity, a criterion for reporting sensing reference signal measurements;

measure sensing reference signals;

communicate, to the network entity, a sensing reference signal measurement report based on the measured sensing signals and the criterion for reporting sensing signal measurements;

operate in one of a joint use mode or a sensing only mode, wherein the joint use mode includes use of sensing reference signals and at least one of uplink positioning reference signals, or downlink positioning reference signals;

receive, from the network entity, a mode switching criterion configuration; and switch between the sensing only mode and the joint use mode based on the mode switching criterion and sensing reference signal measurements.

* * * * *